US012755742B2

(12) United States Patent
Potter et al.

(10) Patent No.: US 12,755,742 B2
(45) Date of Patent: Oct. 6, 2026

(54) AUDIO CONTENT GENERATION AND CLASSIFICATION

(71) Applicant: DOLBY LABORATORIES LICENSING CORPORATION

(72) Inventors: Brenton James Potter, New South Wales (AU); Hadis Nosrati, New South Wales (AU)

(73) Assignee: DOLBY LABORATORIES LICENSING CORPORATION

( * ) Notice: Subject to any disclaimer, the term of this patent is extended or adjusted under 35 U.S.C. 154(b) by 188 days.

(21) Appl. No.: 18/708,561

(22) PCT Filed: Nov. 3, 2022

(86) PCT No.: PCT/US2022/048762
§ 371 (c)(1),
(2) Date: May 8, 2024

(87) PCT Pub. No.: WO2023/086253
PCT Pub. Date: May 19, 2023

(65) Prior Publication Data

US 2025/0006208 A1 Jan. 2, 2025

Related U.S. Application Data

(60) Provisional application No. 63/374,702, filed on Sep. 6, 2022, provisional application No. 63/277,217, filed on Nov. 9, 2021.

(51) Int. Cl.
*G10L 19/008* (2013.01)
*G10L 25/30* (2013.01)
*G10L 25/51* (2013.01)

(52) U.S. Cl.
CPC ............ *G10L 19/008* (2013.01); *G10L 25/30* (2013.01); *G10L 25/51* (2013.01)

(58) Field of Classification Search
CPC ....... G10L 19/008; G10L 25/30; G10L 25/51; G06N 3/0475; G06N 3/0455; G06N 3/088
See application file for complete search history.

(56) References Cited

U.S. PATENT DOCUMENTS 7,295,977 B2 11/2007 Whitman
8,842,842 B2 9/2014 Eppolito
(Continued)

FOREIGN PATENT DOCUMENTS

WO 2018224690 A1 12/2018
WO 2023086424 A1 5/2023

OTHER PUBLICATIONS

Lu et al., "SpecTNT: A time-frequency transformer for music audio." arXiv preprint arXiv:2110.09127 (2021) (Year: 2021).*
(Continued)

*Primary Examiner* — Bhavesh M Mehta
*Assistant Examiner* — Jangwoen Lee

(57) ABSTRACT

Some disclosed methods involve receiving audio data of at least a first audio data type and a second audio data type, including audio signals and associated spatial data indicating intended perceived spatial positions for the audio signals, determining at least a first feature type from the audio data and applying a positional encoding process to the audio data, to produce encoded audio data. The encoded audio data may include representations of at least the spatial data and the first feature type in first embedding vectors of an embedding dimension. Some methods may involve training a neural network, based on the encoded audio data, to transform audio data from an input audio data type having an input spatial data type to a transformed audio data type having a
(Continued)

transformed spatial data type. Some methods may involve training a neural network to identify an input audio data type.

15 Claims, 9 Drawing Sheets

(56) References Cited

U.S. PATENT DOCUMENTS

| | | | | |
|---|---|---|---|---|
| 9,135,929 | B2 | 9/2015 | Mundt | |
| 9,357,153 | B2 | 5/2016 | Nesvadba | |
| 10,044,337 | B2 | 8/2018 | Lu | |
| 10,403,269 | B2 | 9/2019 | Sainath | |
| 2015/0243289 | A1 | 8/2015 | Radhakrishnan | |
| 2017/0272505 | A1 | 9/2017 | Smith | |
| 2018/0084367 | A1* | 3/2018 | Greff | G10L 19/008 |
| 2020/0349953 | A1 | 11/2020 | Qin | |
| 2020/0381003 | A1 | 12/2020 | Gerrard | |
| 2021/0279658 | A1 | 9/2021 | Pruitt | |
| 2024/0022868 | A1* | 1/2024 | Arteaga | G10L 25/30 |

OTHER PUBLICATIONS

Chang, Feng-Ju, et al., "End-to-end multi-channel transformer for speech recognition." ICASSP 2021-2021 IEEE International Conference on Acoustics, Speech and Signal Processing (ICASSP). IEEE, 2021. (Year: 2021).*

Arteaga, et al., "Multichannel-based Learning for Audio Object Extraction", IEEE International Conference on Acoustics, Speech and Signal Processing (ICASSP), Jun. 6, 2021, pp. 206-210.

Grais, et al., "Raw Multi-Channel Audio Source Separation using MultiResolution Convolutional Auto-Encoders", 26th European Signal Processing Conference (EUSIPCO), EURASIP; Sep. 3, 2018, pp. 1577-1581.

Heller, et al, "Design of Ambisonic Decoders for Irregular Arrays of Loudspeakers by Non-Linear Optimization"; Audio Engineering Society Convention Paper, 129th Convention; Nov. 4-7, 2010, pp. 1-22.

Li, et al., "Learnable Fourier Features for Multi-Dimensional Spatial Positional Encoding", 35th Conference on Neural Information Processing Systems, 2021, pp. 1-14.

Nugraha et al., "Multichannel Audio Source Separation With Deep Neural Networks", IEEE/ACM Transactions on Audio, Speech, and Language Processing, IEEE, USA; vol. 24; No. 9; Sep. 1, 2016, pp. 1652-1664.

Vaswani, et al., "Attention is All You Need", Advances in Neural Information Processing Systems , NIPS 2017, arXiv:1706.03762v7, Jun. 12, 2017, 12 pages.

Weimin, et al., "Acoustic scene analysis with multi-head attention networks", arxiv.org, Cornell University Library, 201 Olin Library Cornell University Ithaca, NY 14853, Sep. 16, 2019, 8 Pages.

* cited by examiner

600

800

AUDIO CONTENT GENERATION AND CLASSIFICATION

CROSS REFERENCE TO RELATED APPLICATIONS

This application is a U.S. National Stage application under U.S.C. 371 of International Application No. PCT/US2022/048762, filed on Nov. 3, 2022 (reference: D21107WO01), which claims the benefit of priority from U.S. Provisional Patent Application No. 63/277,217, filed on Nov. 9, 2021, and U.S. Provisional Patent Application No. 63/374,702, filed on Sep. 6, 2022, all of which are incorporated herein by reference in their entirety.

TECHNICAL FIELD

This disclosure pertains to devices, systems and methods for generating new audio content based on existing audio content, as well as to devices, systems and methods for classifying audio content.

BACKGROUND

While existing methods of classifying audio content can provide adequate results in some contexts, more advanced methods would be desirable.

NOTATION AND NOMENCLATURE

Throughout this disclosure, including in the claims, the terms “speaker,” “loudspeaker” and “audio reproduction transducer” are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker signal(s) may undergo different processing in different circuitry branches coupled to the different transducers.

Throughout this disclosure, including in the claims, the expression performing an operation “on” a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression “system” is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term “processor” is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term “couples” or “coupled” is used to mean either a direct or indirect connection. Thus, if a first device couples to a second device, that connection may be through a direct connection, or through an indirect connection via other devices and connections.

As used herein, a “smart device” is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term “smart device” may also refer to a device that exhibits some properties of ubiquitous computing, such as artificial intelligence.

Herein, we use the expression “smart audio device” to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modem TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is a smart audio device, such as a “smart speaker,” that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a “virtual assistant.” A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more audio processing methods. In some instances, the method(s) may be implemented, at least in part, by a control system and/or via instructions (e.g., software) stored on one or more non-transitory media. Some such methods involve receiving, by a control system, first audio data of a first audio data type including one or more first audio signals and associated first spatial data. The first spatial data may indicate intended perceived spatial positions for the one or more first audio signals. In some examples, the method may involve determining, by the control system, at least a first feature type from the first audio data. The method may involve applying, by the control system, a positional encoding process to the first audio data, to produce first encoded audio data. In some examples, the first encoded audio data may include representations of at least the first spatial data and the first feature type in first embedding vectors of an embedding dimension.

In some examples, the method may involve receiving, by the control system, second audio data of a second audio data type that includes one or more second audio signals and associated second spatial data. According to some examples, the second audio data type may be different from the first audio data type. In some examples, the second spatial data may indicate intended perceived spatial positions for the one or more second audio signals. In some examples, the method may involve determining, by the control system, at least the first feature type from the second audio data.

According to some examples, the method may involve applying, by the control system, the positional encoding process to the second audio data, to produce second encoded audio data. In some examples, the second encoded audio data may include representations of at least the second spatial data and the first feature type in second embedding vectors of the embedding dimension.

In some examples, the method may involve training a neural network implemented by the control system to transform audio data from an input audio data type having an input spatial data type to a transformed audio data type having a transformed spatial data type. In some examples the training may be based, at least in part, on the first encoded audio data and the second encoded audio data.

According to some examples, the method may involve receiving $1^{st}$ through $N^{th}$ audio data of $1^{st}$ through $N^{th}$ input audio data types that include $1^{st}$ through $N^{th}$ audio signals and associated $1^{st}$ through $N^{th}$ spatial data, N being an integer greater than 2. In some such examples, the method may involve determining, by the control system, at least the first feature type from the $1^{st}$ through $N^{th}$ input audio data types, applying, by the control system, the positional encoding process to the $1^{st}$ through $N^{th}$ audio data, to produce $1^{st}$ through $N^{th}$ encoded audio data, and training the neural network based, at least in part, on the $1^{st}$ through $N^{th}$ encoded audio data.

In some examples, the neural network may be, or may include, an attention-based neural network. In some examples, the neural network may include a multi-head attention module.

According to some examples, training the neural network may involve training the neural network to transform the first audio data to a first region of a latent space and to transform the second audio data to a second region of the latent space. In some examples, the second region may be at least partially separate from the first region.

In some examples, the intended perceived spatial position corresponds to at least one of a channel of a channel-based audio format or positional metadata.

According to some examples, the input spatial data type may correspond to a first audio data format and the transformed audio data type may correspond to a second audio data format. In some examples, the input spatial data type may correspond to a first number of channels and the transformed audio data type may correspond to a second number of channels. In some examples, the first feature type may correspond to a frequency domain representation of audio data.

In some examples, the method may involve determining, by the control system, at least a second feature type from the first audio data and the second audio data. In some such examples, the positional encoding process may involve representing the second feature type in the embedding dimension.

According to some examples, the method may involve receiving, by the control system, audio data of the input audio data type. In some such examples, the method may involve transforming the audio data of the input audio data type to the transformed audio data type.

Some alternative methods may involve receiving, by a control system, audio data of an input audio data type having an input spatial data type and transforming, by the control system, the audio data of the input audio data type to audio data of a transformed audio data type having a transformed spatial data type. According to some examples, the transforming may involve implementing, by the control system, a neural network trained to transform audio data from the input audio data type to the transformed audio data type. In some such examples, the neural network may have been trained, at least in part, on encoded audio data resulting from a positional encoding process. The encoded audio data may include representations of at least first spatial data and a first feature type in first embedding vectors of an embedding dimension. The first spatial data may indicate intended perceived spatial positions for reproduced audio signals. According to some examples, the input spatial data type may correspond to a first audio data format and the transformed audio data type may correspond to a second audio data format.

Some alternative methods may involve receiving, by a control system, first audio data of a first audio data type including one or more first audio signals and associated first spatial data. The first spatial data may indicate intended perceived spatial positions for the one or more first audio signals. In some examples, the method may involve determining, by the control system, at least a first feature type from the first audio data. According to some examples, the method may involve applying, by the control system, a positional encoding process to the first audio data, to produce first an encoded audio data. In some examples, the first encoded audio data may include representations of at least the first spatial data and the first feature type in first embedding vectors of an embedding dimension.

According to some examples, the method may involve receiving, by the control system, second audio data of a second audio data type including one or more second audio signals and associated second spatial data. The second audio data type may, in some examples, be different from the first audio data type. In some examples, the second spatial data may indicate intended perceived spatial positions for the one or more second audio signals.

In some examples, the method may involve determining, by the control system, at least the first feature type from the second audio data. According to some examples, the method may involve applying, by the control system, the positional encoding process to the second audio data, to produce second encoded audio data. In some examples, the second encoded audio data may include representations of at least the second spatial data and the first feature type in second embedding vectors of the embedding dimension. In some examples, the method may involve training a neural network implemented by the control system to identify an input audio data type of input audio data. According to some examples, the training may be based, at least in part, on the first encoded audio data and the second encoded audio data.

In some examples, identifying the input audio data type may involve identifying a content type of the input audio data. According to some examples, identifying the input audio data type may involve determining whether the input audio data may correspond to a podcast, movie or television program dialogue, or music. In some examples, the method may involve training the neural network to generate new content of a selected content type.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via apparatus. For example, one or more devices (e.g., a system that includes one or more devices) may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system may be configured for implementing some or all of the methods disclosed herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Generalizations can be made about the way in which audio content has been created and conventions are commonly followed between audio content of the same class. For example, in Dolby 5.1 and 7.1 channel audio content corresponding to a movie or a television program, main dialogue speech is generally positioned in the front center speaker and momentary special effects are generally positioned in the rear. Similarly, in Dolby 5.1 and 7.1 channel audio content corresponding to music, the audio corresponding to the lead singer is generally positioned in the front center speaker.

There is a need to model and understand the complex relationships of signals in the context of multi-channel audio content. As used herein, the term "multi-channel audio content" may refer to any audio with a plurality of channels, ranging from, for example; single channel dialogue and podcasts, stereo music and movie content, multi-channel movie soundtrack and dialogue and multi-channel music content. Although object-based audio formats such as Dolby Atmos™ are not literally channel-based, the term "multi-channel audio content" as used herein is also intended to apply to such audio formats.

The present disclosure describes methods, devices and systems for modelling the complex multi-dimensional relationships between channels in audio content. Some disclosed examples involve identifying latent space variables corresponding to a body of audio content that arise after reinforcement learning and which describe the principle variances within the body of audio content.

In some disclosed examples, the power of neural networks is leveraged to identify such latent space variables. Some disclosed examples are configured for identification of audio content type based on the nature of these latent variables. Alternatively, or additionally, some disclosed examples are configured for arbitrary generation of new audio content based on the nature of these latent variables. The new audio content may, for example, be representative of a desired audio content class, such as movie dialogue, podcast, music, etc. Some such examples may involve identifying a transformation function that may be applied to transform audio data from having an input spatial data type to audio data having a transformed spatial data type. According to some such examples, the input spatial data type may include a lower number of channels than the transformed spatial data type. Some examples disclose novel methods of positional encoding for training a neural network.

Figure 1:
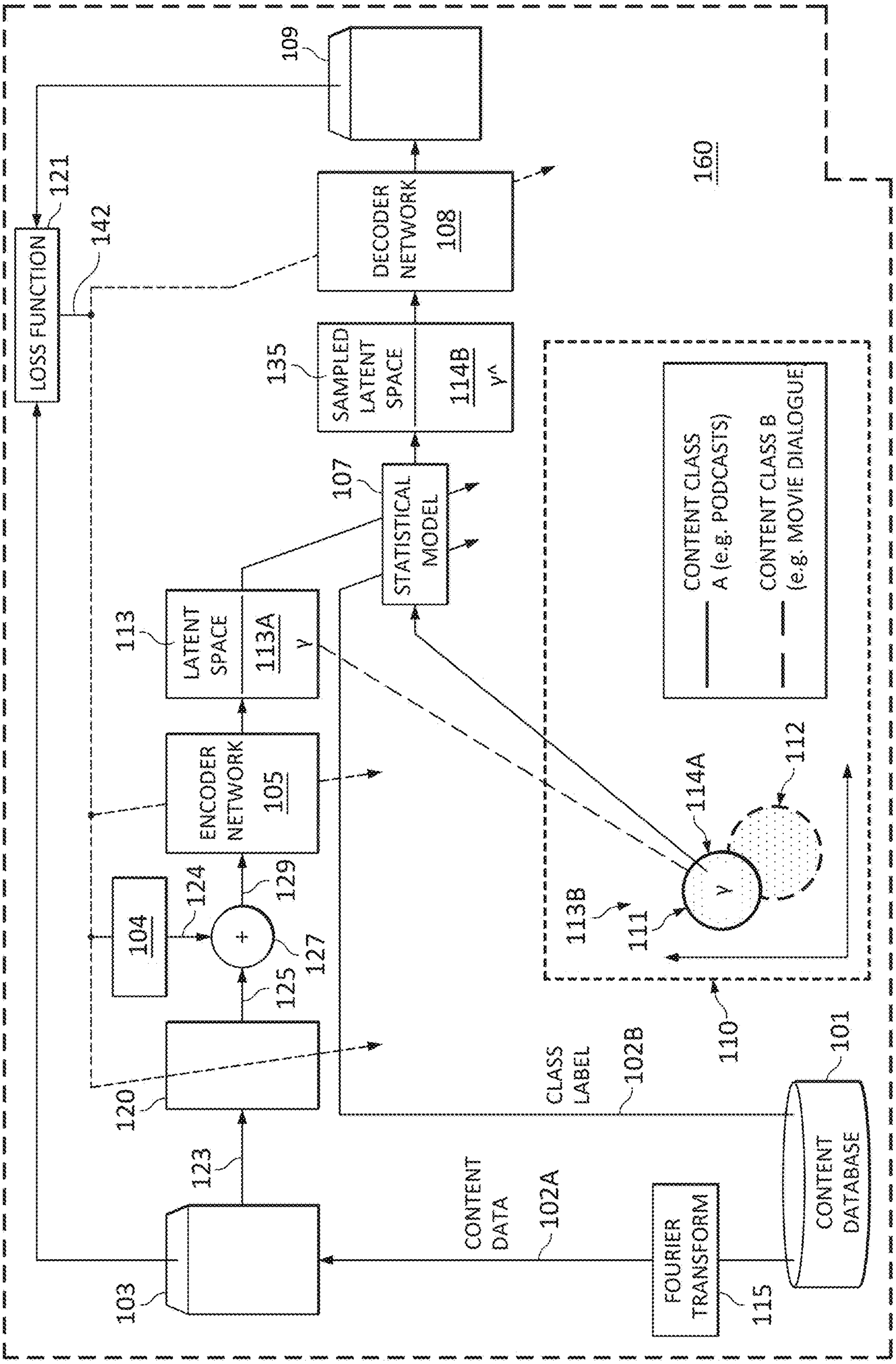
FIG. 1 shows examples of blocks that may be involved in training a neural network according to some disclosed implementations.

FIG. 1 shows examples of blocks that may be involved in training a neural network according to some disclosed implementations. As with other figures provided herein, the types, numbers and arrangement of elements shown in FIG. 1 are merely provided by way of example. Other implementations may include more, fewer and/or different types, numbers and/or arrangements of elements. In this example, the blocks of FIG. 1 are implemented by a control system 160, an example of which is described in detail with reference to FIG. 2B.

According to this example, the elements of FIG. 1 are as follows:

101: A training content database, which includes audio data for training a neural network. In some examples, the training content database may include multiple classes of audio content. For example, one class of audio data may correspond to movie dialogues, another class of audio data may correspond to podcasts, another class of audio data may correspond to music, etc. In some examples, the training content database 101 may include audio data in multiple audio formats for one or more classes of audio content. The audio formats may, in some examples, include canonical audio formats such as Dolby 5.1 format, Dolby 6.1 format, Dolby 7.1 format, Dolby 9.1 format, Dolby Atmosrm format, etc. As used herein, an audio format referred to as X.1 format refers generally to X.1, X.2, etc. For example, a reference to Dolby 9.1 format will also apply to Dolby 9.2 format, unless otherwise specified. According to the example shown in FIG. 1, the audio data in the training content database 101 includes, or represents, audio signals and corresponding spatial data. The spatial data indicates intended perceived spatial positions for the audio signals. The intended perceived spatial positions may correspond to channels of a channel-based audio format or positional metadata of an object-based audio format;

102A: Digital samples of audio data from the training content database 101 after transformation from the time domain to the frequency domain;

102B: Labels that identify the class of audio content, such as movie dialogue, podcast, music, etc., corresponding to the digital samples 102A;

103: Input transform block, configured to extract features from the digital samples of audio data 102A and to produce input feature data 123. Here, the input feature data 123 includes one or more (and in some examples, many) types of audio features representing short (temporally) contextual windows. A temporally short contextual window may, for example, be a time interval of less than one second, such as a 100 ms time interval, a 200 ms time interval, a 300 ms time interval, a 400 ms time interval, a 500 ms time interval, a 600 ms time interval, a 700 ms time interval, an 800 ms time interval, etc. In some examples, the input feature data 123 may be represented as X(T,C,B), where T represents a time frame, C represents a content channel and B represents a discrete Fourier bin;

104: A positional encoding signal generator block, which is configured to output positional encoding information 124. The positional encoding information 124 may, in some examples, correspond to a positional encoding matrix;

105: An encoder neural network, which is configured to transform the encoder network input data 129 into encoded audio data 113. The encoded audio data 113 may be, or may include, latent space vectors of a multi-dimensional latent space. Accordingly, in some instances the encoded audio data 113 may be referred to as latent space vectors 113. The multi-dimensional latent space also may be referred to herein as an encoding space or an encoding dimension. In some examples, the encoder neural network 105 may be, or may include, a multi-head attention neural network;

107: Statistical model of latent space vectors 113 for all audio content in the training content database 101;

108: A decoder neural network, which is configured to decode the encoded audio data 113. In this example, decoding the encoded audio data 113 involves transforming the latent space vectors 113 from latent space coordinates to "real world" feature data 109. In this example, the output feature data 109 includes the same types of features as the input feature data 123;

109: Feature data output by the decoder neural network 108 and provided to the loss function block 121. In this example, the loss function data 142 are based, at least in part on a comparison of the input feature data 123 and the output feature data 109;

110: A graph that shows the statistical model 107's representation of latent space variables in two dimensions. In this example, the graph 110 is a two-dimensional representation of a higher-dimensional latent space;

111: A two-dimensional representation of an audio content class A according to one example;

112: A two-dimensional representation of an audio content class B according to one example;

113A: An example of a latent space variable, which is also represented as Yin FIG. 1;

113B: The position of the latent space variable 113A in the two-dimensional space of graph 110;

114A: A sampled point from within statistical model 107's representation of content class A;

115: A Fourier transform block that is configured to transform audio data in the content database 101 from the time domain to the frequency domain. In some examples, the Fourier transform block 115 will also apply an absolute operation to provide only the magnitude of the input data. However, in some alternative examples, the Fourier transform block 115 may provide complex Fourier information;

120: An input dimensional transform block, which is configured for mapping features 123 to the encoding dimension D of higher-dimensional space features 125. The encoding dimension D also may be referred to herein as a hidden dimension D. In this example, the number of dimensions of the higher-dimensional space features 125 (in other words, the number of dimensions of D) should match the number of dimensions of the positional encoding information 124 output by the positional encoding signal generator block 104;

121: A loss function block, which is configured to output loss function data 142, which may be used as feedback for training the input dimensional transform block, the positional encoding signal generator block 104, the encoder network 105 and/or the decoder network 108. The loss function data 142 may, for example, include prediction and target inputs, and weight updates;

123: Features output by the input transform block 103;

124: Positional encoding information 124 output by the positional encoding signal generator block 104;

125: Higher-dimensional space features output by the dimensional transform block 120;

127: A summation block, which is configured to combine the higher-dimensional space features 125 with the positional encoding information 124, to produce the encoder network input data 129; and

129: Encoder network input data produced by the summation block 127 and provided to the encoder network 105.

The training data stored in the training content database 101 should include a wide range of content, with the ideal being "all digitized content that exists" but the practical being that which is accessible, that which complies with licensing legal requirements, and that which can be supplied to the neural network model and trained in a reasonable amount of time. The number of audio channels of the training data should vary, and where appropriate, data of higher-channel surround sound formats should also be presented downmixed in lower-channel formats in order to best exemplify the variance within data over a range of surround sound channel formats. In some examples, data may be generated in guided ways in which, for example, an empirical estimate of the typical variance that content may exemplify is exercised by composing multiple pieces of content in surround sound format domains, such as Dolby Atmos™, where audio channels are represented as objects which can occupy arbitrary positions in space.

In some examples, noise may be added to data in order to obfuscate parts of the input data from the network during training and to perturb optimization to find a solution which is best able to satisfy the desired task. Similarly, in some examples data may be omitted at times especially either (a) in the channel dimension where data may be omitted entirely on select channels, or (b) temporally, in small time segments. The latter may encourage the network to best model the data.

A neural network may be trained via offline training (e.g., prior to deployment by an end user), online training (e.g., during deployment by an end user) or by a combination of both offline training and online training.

The loss function block 121 may implement one or more cost functions that are used to train the neural network. In some examples, the cost function(s) may be chosen by a person, such as a system designer. The cost function(s) may, in some examples, be chosen in such a way as to attempt to make the encoder-decoder network best find a globally optimal fit for the input and output training data in an unsupervised neural network optimization setting. The definition of "globally optimal" is application-dependent and may, for example, be chosen by the system designer. In some examples, the cost function(s) may be selected to optimize for one or more of the following:

Produce maximal distances between distributions of application specific class embeddings/latent space vectors to best use said vectors in classification and clustering tasks.

Minimise noise, or discontinuity in tasks where latent space vectors are sampled from a distribution function to produce novel audio data that satisfies certain properties relative to the distribution is latent space being sampled.

Generate meaningful, subjectively desirable novel content in audio channels for which the network is being tasked with interpolating or generating, from existing data.

Provide a globally optimal fit of an underlying function in latent space, which, suitably can interpolate between formats of data, e.g., content in order to transform an identified piece of data from one content class to another, by way of linear transformation in the latent space.

Any combination of the above.

According to some examples, the loss function block 121 may implement one or more cost functions that are based, at least in part on the L1 norm, which is calculated as the sum of the absolute values of a vector, on the L2 norm, which is calculated as the square root of the sum of the squared vector values, or combinations thereof. L1 and L2 loss functions may, for example, be used to perturb the model in training to converge to a solution that best matches the decoder output with the encoder input audio. The use of rudimentary loss functions is to support an unsupervised training procedure. According to some such examples, due to the previously-mentioned additive noise, and masking in both channel and time, there may not be a need for more complicated loss functions.

In addition to using one or more loss functions, in some examples the neural network training procedure may be perturbed in the latent space, for example by way of quantizing, Gaussian fitting and sampling, or otherwise interpolating and modifying of the latent vector, to produce a latent space which best suits the task of audio data generation or audio data classification.

Figure 2A:
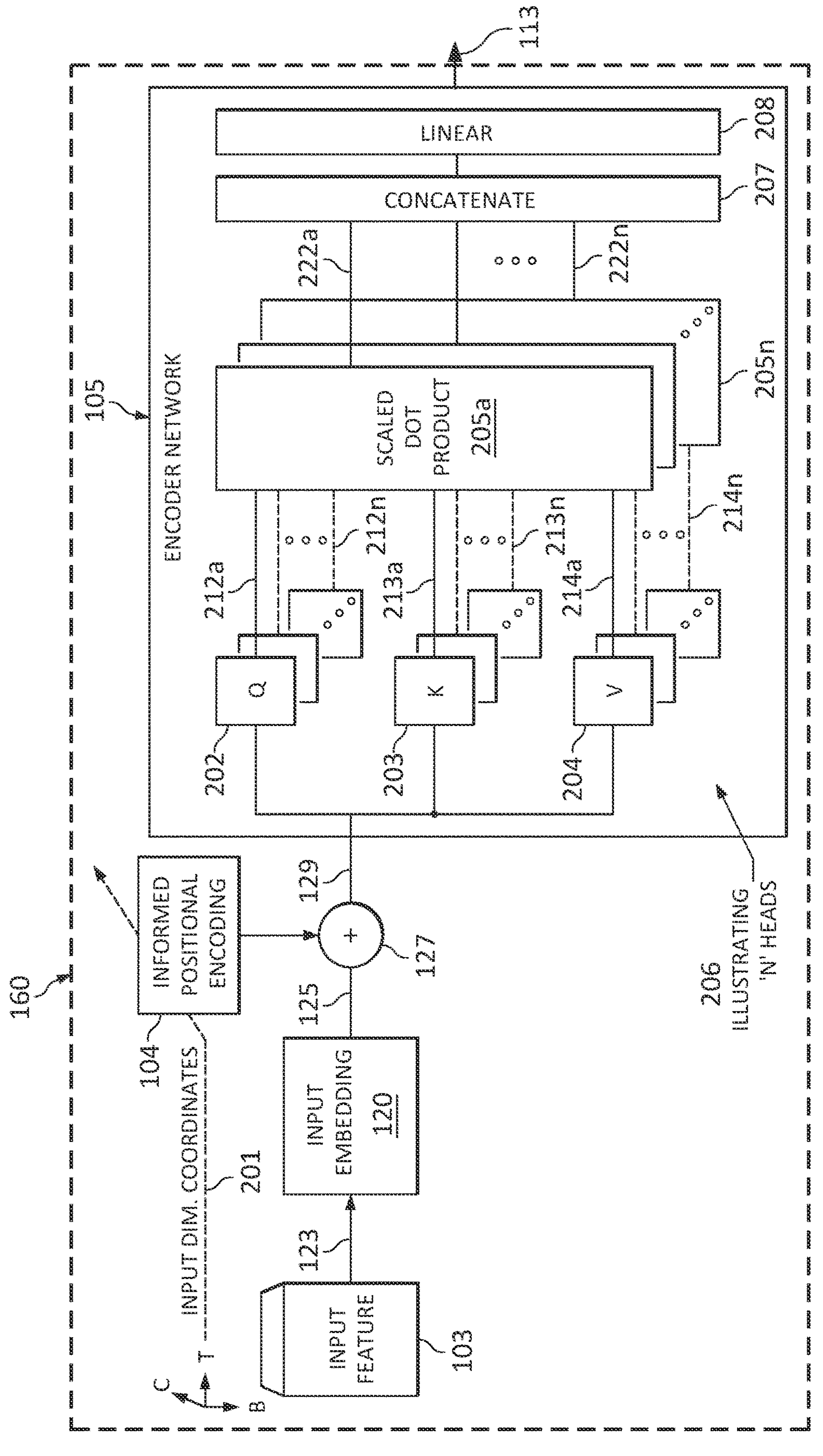
FIG. 2A shows examples of blocks that may be involved in training a neural network according to some examples.

FIG. 2A shows examples of blocks that may be involved in training a neural network according to some examples. As with other figures provided herein, the types and numbers of elements shown in FIG. 2A are merely provided by way of example. Other implementations may include more, fewer and/or different types and numbers of elements. In this example, the blocks of FIG. 2A are implemented by a control system 160, an example of which is described in detail with reference to FIG. 2B.

FIG. 2A shows an example in which the encoder neural network 105 of FIG. 1 is a multi-head attention neural network having N heads. According to this example, the elements of FIG. 2A that have not already been described with reference to FIG. 1 are as follows:

201: The input dimension coordinates, which describe the real-world, discrete units that at which the input feature 103 is sampled;

202: A query (Q) transform block, which is configured to apply $1^{st}$ through $N^{th}$ different linear transformations (which may be learned linear transformations) to the encoder network input data 129 that is produced by the summation block 127, to produce queries 212*a* through 212*n*, corresponding to the N heads of the multi-head attention process;

203: A key (K) transform block, which is configured to apply $1^{st}$ through $N^{th}$ different linear transformations (which may be learned linear transformations) to the encoder network input data 129, to produce keys 213*a* through 213*n;*

204: A value (V) transform block, which is configured to apply $1^{st}$ through $N^{th}$ different linear transformations (which may be learned linear transformations) to the encoder network input data 129, to produce values 214*a* through 214*n;*

205*a*-205*n*: Scaled dot product modules, one corresponding to each of the N heads of the multi-head attention process, each which is configured to implement a multi-head attention process in which the attention function is performed in parallel on the queries 212*a* through 212*n*, the keys 213*a* through 213*n* and the values 214*a* through 214*n*, to produce output values 222*a*-222*n*. Relevant scaled dot product attention processes and multi-head attention processes are described in A. Vaswani et al, "Attention Is All You Need," (31st Conference on Neural Information Processing Systems (NIPS 2017)), particularly in Section 3, pages 2-6, which is hereby incorporated by reference;

206: Multiple (N) transformer heads illustrated as parallel networks;

207: A concatenation block, which is configured to combine the output values 222*a*-222*n* of each head's scaled dot product; and

208: A final linear transformation block that is configured to project and combine output each of the heads, to produce the encoded audio data 113, which also may be referred to herein as latent space vectors 113.

Figure 2B:
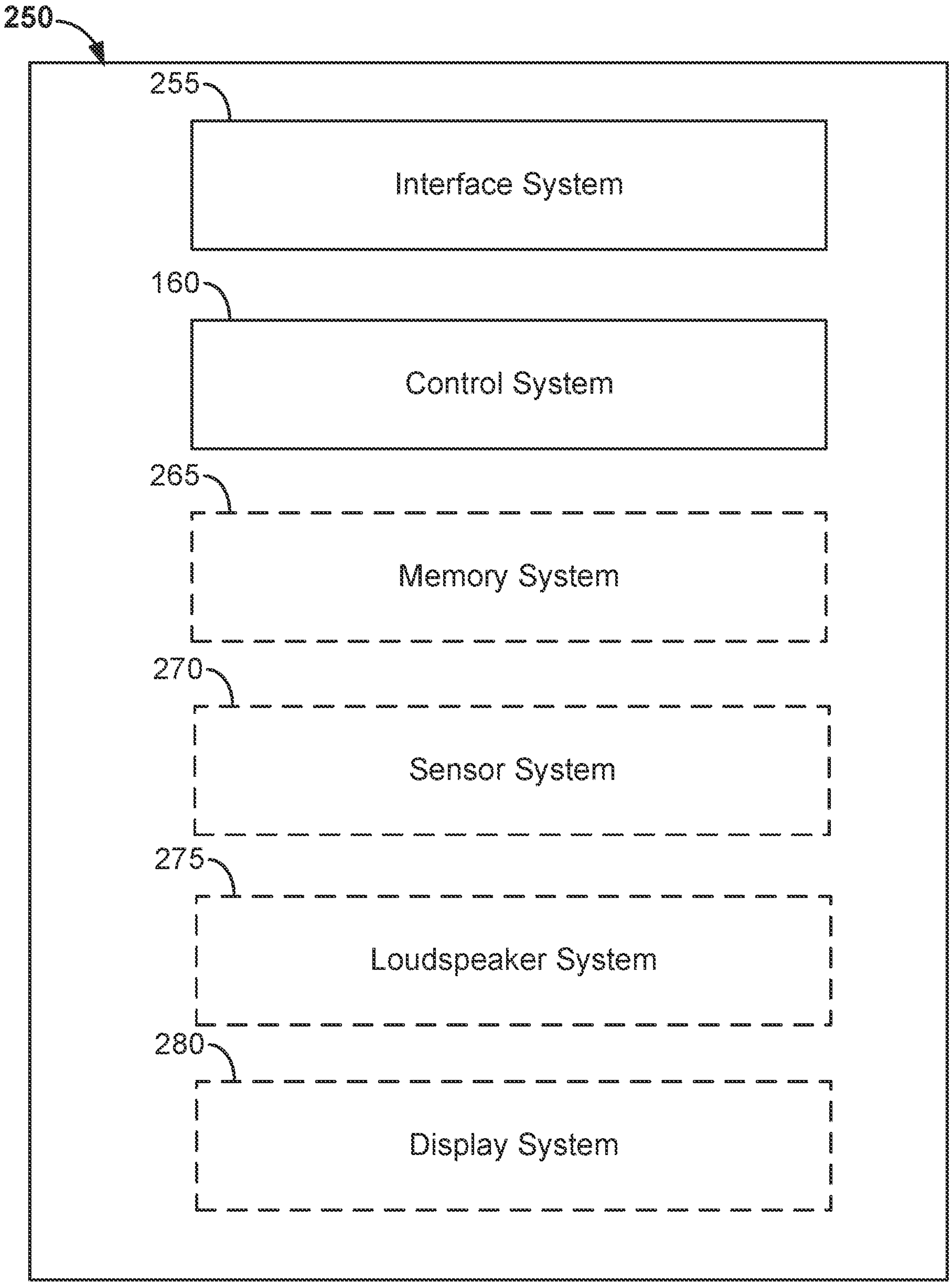
FIG. 2B is a block diagram that shows examples of components of an apparatus capable of implementing various aspects of this disclosure.

FIG. 2B is a block diagram that shows examples of components of an apparatus capable of implementing various aspects of this disclosure. As with other figures provided herein, the types and numbers of elements shown in FIG. 2B are merely provided by way of example. Other implementations may include more, fewer and/or different types and numbers of elements. According to some examples, the apparatus 250 may be configured for performing at least some of the methods disclosed herein. In some implementations, the apparatus 250 may be, or may include, one or more components of an audio system. For example, the apparatus 250 may be an audio device, such as a smart audio device, in some implementations. In other examples, the examples, the apparatus 250 may be a mobile device (such as a cellular telephone), a laptop computer, a tablet device, a television or another type of device.

According to some alternative implementations the apparatus 250 may be, or may include, a server. In some such examples, the apparatus 250 may be, or may include, an encoder. Accordingly, in some instances the apparatus 250 may be a device that is configured for use within an audio environment, such as a home audio environment, whereas in other instances the apparatus 250 may be a device that is configured for use in "the cloud," e.g., a server.

In this example, the apparatus 250 includes an interface system 255 and a control system 160. The interface system 255 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 255 may, in some implementations, be configured for exchanging control information and associated data with audio devices of the audio environment. The control information and associated data may, in some examples, pertain to one or more software applications that the apparatus 250 is executing.

The interface system 255 may, in some implementations, be configured for receiving, or for providing, a content stream. The content stream may include audio data. The audio data may include, but may not be limited to, audio signals. In some instances, the audio data may include spatial data, such as channel data and/or spatial metadata. Metadata may, for example, have been provided by what may be referred to herein as an "encoder." In some examples, the content stream may include video data and audio data corresponding to the video data.

The interface system 255 may include one or more network interfaces and/or one or more external device interfaces (such as one or more universal serial bus (USB) interfaces). According to some implementations, the interface system 255 may include one or more wireless interfaces. The interface system 255 may include one or more devices for implementing a user interface, such as one or more microphones, one or more speakers, a display system, a touch sensor system and/or a gesture sensor system. Accordingly, while some such devices are represented separately in FIG. 2B, such devices may, in some examples, correspond with aspects of the interface system 255.

In some examples, the interface system 255 may include one or more interfaces between the control system 160 and a memory system, such as the optional memory system 265 shown in FIG. 2B. However, the control system 160 may include a memory system in some instances. The interface system 255 may, in some implementations, be configured for receiving input from one or more microphones in an environment.

The control system 160 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 160 may reside in more than one device. For example, in some implementations a portion of the control system 160 may reside in a device within one of the environments depicted herein and another portion of the control system 160 may reside in a device that is outside the environment, such as a server, a mobile device (e.g., a smartphone or a tablet computer), etc. In other examples, a portion of the control system 160 may reside in a device within one of the environments depicted herein and another portion of the control system 160 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 160 may reside in a device that is implementing a cloud-based service, such as a server, and another portion of the control system 160 may reside in another device that is implementing the cloud-based service, such as another server, a memory device, etc. The interface system 255 also may, in some examples, reside in more than one device.

In some implementations, the control system 160 may be configured for performing, at least in part, the methods disclosed herein. According to some examples, the control system 160 may be configured to receive audio data of at least a first audio data type and a second audio data type, including audio signals and associated spatial data indicating intended perceived spatial positions for the audio signals. In some such examples, the control system 160 may be configured to determine at least a first feature type from the audio data and to apply a positional encoding process to the audio data, to produce encoded audio data. The encoded audio data may include representations of at least the spatial data and the first feature type in first embedding vectors of an embedding dimension. The spatial data may, in some examples, be considered another type of feature, in addition to the "first feature type."

According to some examples, the control system 160 may be configured to implement a trained or untrained neural network. In some such examples, the neural network may be, or may include, an attention-based neural network.

Some disclosed methods may involve training a neural network implemented by the control system 160, based at least in part on the encoded audio data, to transform audio data from an input audio data type having an input spatial data type to a transformed audio data type having a transformed spatial data type. For example, a trained neural network implemented by the control system 160 may be configured to transform a movie sound track from the Dolby 5.1 format to the Dolby 7.1 format, even if there was no previously-existing version of the movie sound track in the Dolby 7.1 format. In some such examples, there may not have been any higher-channel version of the movie soundtrack than the Dolby 5.1 version.

Some disclosed methods may involve training a neural network implemented by the control system 160 to identify an input audio data type. For example, a trained neural network implemented by the control system 160 may be configured to determine whether input audio data corresponds to music, a podcast, a movie soundtrack, a television program soundtrack, etc.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 265 shown in FIG. 2B and/or in the control system 160. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 160 of FIG. 2B.

In some implementations, the apparatus 250 may include the optional sensor system 270 shown in FIG. 2B. The optional sensor system 270 may include one or more touch sensors, gesture sensors, motion detectors, etc. According to some implementations, the optional sensor system 270 may include one or more cameras. In some implementations, the cameras may be free-standing cameras. In some examples, one or more cameras of the optional sensor system 270 may reside in a smart audio device, which may be a single purpose audio device or a virtual assistant. In some such examples, one or more cameras of the optional sensor system 270 may reside in a television, a mobile phone or a smart speaker. In some examples, the apparatus 250 may not include a sensor system 270. However, in some such implementations the apparatus 250 may nonetheless be configured to receive sensor data for one or more sensors in an audio environment via the interface system 160.

In some examples, optional sensor system 270 includes an optional microphone system. The optional microphone system may include one or more microphones. According to some examples, the optional microphone system may include an array of microphones. In some examples, the array of microphones may be configured to determine direction of arrival (DOA) and/or time of arrival (TOA) information, e.g., according to instructions from the control system 160. The array of microphones may, in some instances, be configured for receive-side beamforming, e.g., according to instructions from the control system 160. In some implementations, one or more of the microphones may be part of, or associated with, another device, such as a loudspeaker of the loudspeaker system 275, a smart audio device, etc.

In some examples, the apparatus 250 may not include a microphone system. However, in some such implementations the apparatus 250 may nonetheless be configured to receive microphone data for one or more microphones in an audio environment via the interface system 160. In some such implementations, a cloud-based implementation of the apparatus 250 may be configured to receive microphone data, or data corresponding to the microphone data, from one or more microphones in an audio environment via the interface system 160.

According to some implementations, the apparatus 250 may include the optional loudspeaker system 275 shown in FIG. 2B. The optional loudspeaker system 275 may include one or more loudspeakers, which also may be referred to herein as "speakers" or, more generally, as "audio reproduction transducers." In some examples (e.g., cloud-based implementations), the apparatus 250 may not include a loudspeaker system 275.

In some implementations, the apparatus 250 may include the optional display system 280 shown in FIG. 2B. The optional display system 280 may include one or more displays, such as one or more light-emitting diode (LED) displays. In some instances, the optional display system 280 may include one or more organic light-emitting diode (OLED) displays. In some examples, the optional display system 280 may include one or more displays of a smart audio device. In other examples, the optional display system 280 may include a television display, a laptop display, a mobile device display, or another type of display. In some examples wherein the apparatus 250 includes the display system 280, the sensor system 280 may include a touch sensor system and/or a gesture sensor system proximate one or more displays of the display system 280. According to some such implementations, the control system 160 may be configured for controlling the display system 280 to present one or more graphical user interfaces (GUIs).

According to some such examples the apparatus 250 may be, or may include, a smart audio device, such as a smart speaker. In some such implementations the apparatus 250 may be, or may include, a wakeword detector. For example, the apparatus 250 may be configured to implement (at least in part) a virtual assistant.

Figure 3A:
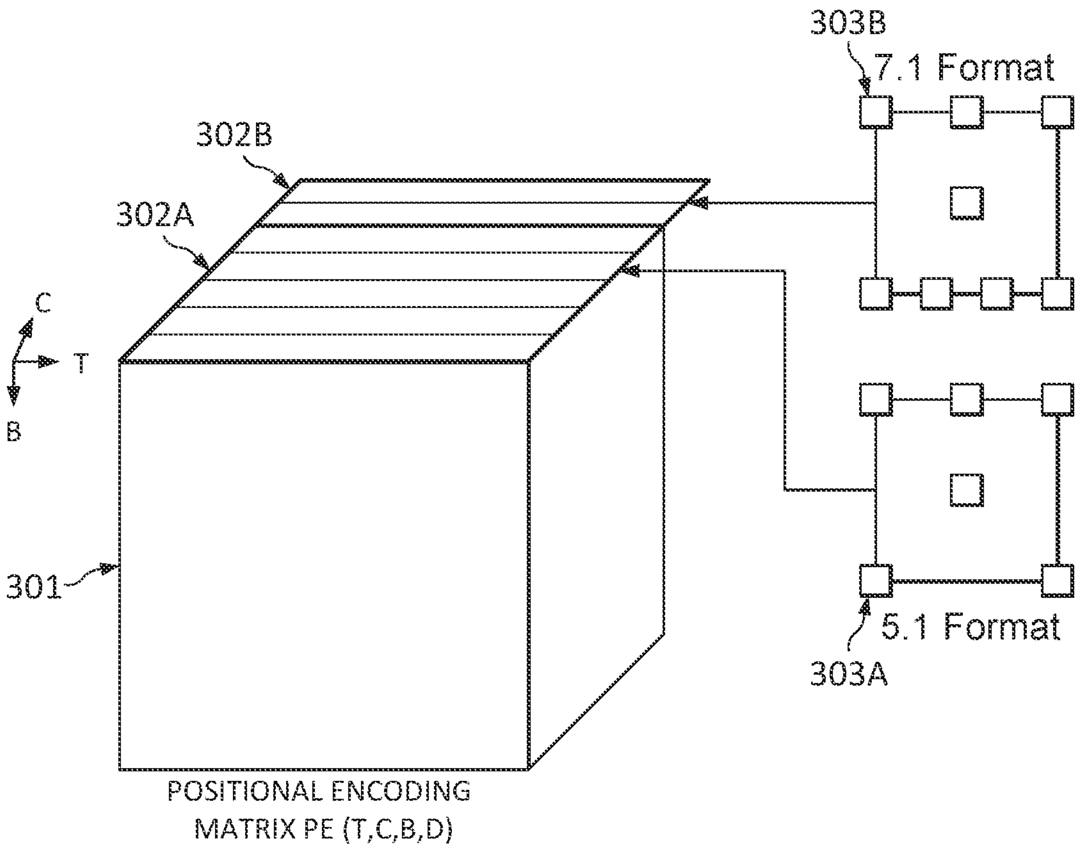
FIG. 3A shows a representation of a positional encoding matrix according to one example.
Figure 4:
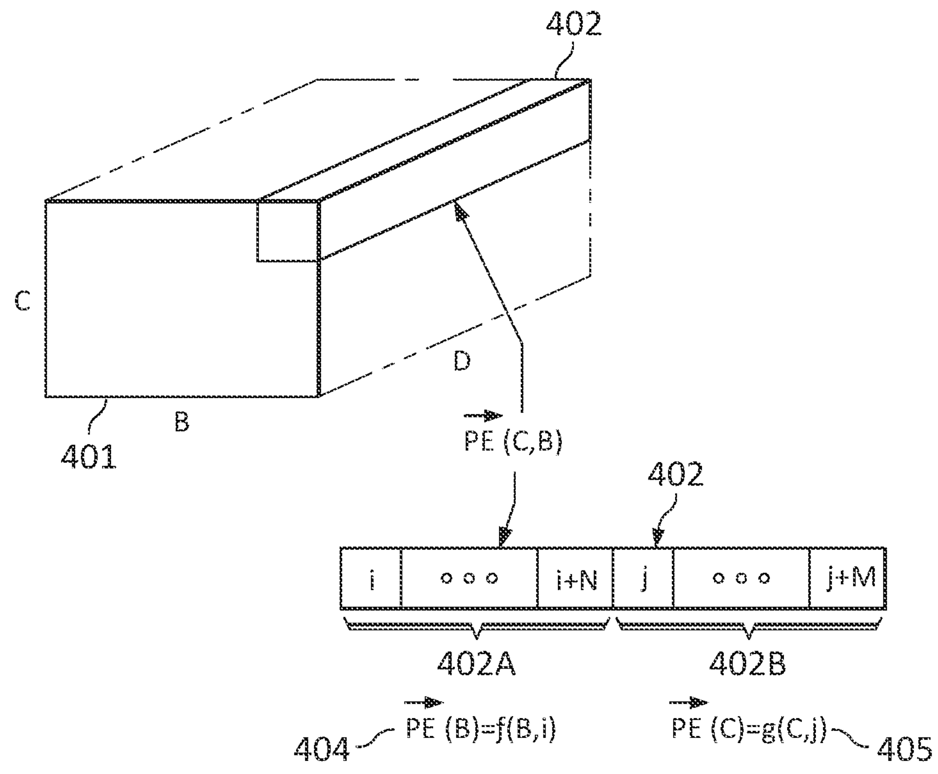
FIG. 4 shows a representation of a positional encoding matrix according to another example.

FIG. 3A shows a representation of a positional encoding matrix according to one example. This example shows the relationships between multi-channel format regions 302A and 302B of the positional encoding matrix 301, and the physical presentation formats 303A and 303B, respectively. According to this example, the elements of FIG. 3A are as follows:

- 301: An example of a three-dimensional representation of a four-dimensional positional encoding matrix. In this example, the positional encoding matrix 301 is expressed as PE(T,C,B,D), where T represents a time frame, C represents an audio content channel, B represents a discrete Fourier bin, D represents an encoding dimension, which is not shown in the three-dimensional representation of FIG. 3A, and PE stands for positional encoding. Examples of the D dimension of a four-dimensional positional encoding matrix are shown in FIG. 4 and are described below;
- 302A: A multi-channel format region of the positional encoding matrix 301 corresponding to audio data in a Dolby 5.1 audio format;
- 302B: A multi-channel format region of the positional encoding matrix 301 corresponding to audio data in a Dolby 7.1 audio format;
- 303A: A representation of loudspeaker positions corresponding to a Dolby 5.1 audio format; and
- 303B: A representation of loudspeaker positions corresponding to a Dolby 7.1 audio format.

Figure 3B:
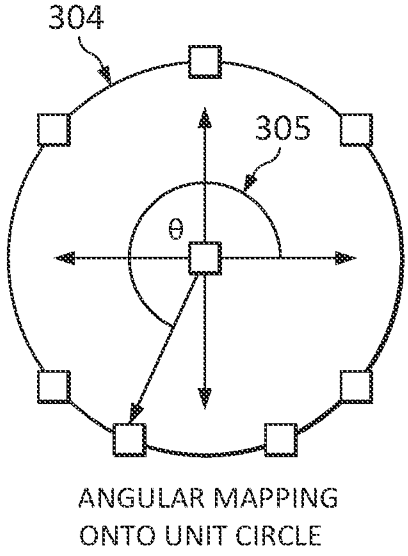
FIG. 3B shows an example of mapping loudspeaker positions onto a unit circle.

FIG. 3B shows an example of mapping loudspeaker positions onto a unit circle. In this example, FIG. 3B shows a mapping of loudspeaker positions corresponding to a Dolby 7.1 audio format onto a unit circle 304. Instead of Cartesian or (x,y) coordinate positions, as suggested by the representations of loudspeaker positions 303B of FIG. 3A, in FIG. 3B the loudspeaker positions corresponding to a Dolby 7.1 audio format are indicated as angular coordinates, which in this example correspond to values of an angle theta ($\Theta$). Although only loudspeaker positions corresponding to a Dolby 7.1 audio format are shown in FIG. 3B, loudspeaker positions corresponding to other audio formats also may be represented as angular coordinates in the same manner.

As described elsewhere herein, some disclosed examples involve receiving, by a control system, audio data of a first audio data type including one or more first audio signals and associated first spatial data. The first spatial data may indicate intended perceived spatial positions for the one or more first audio signals. Some disclosed examples involve receiving, by the control system, audio data of a second audio data type including one or more second audio signals and associated second spatial data. The first spatial data may indicate intended perceived spatial positions for the one or more first audio signals and the second spatial data may indicate intended perceived spatial positions for the one or more second audio signals. Some disclosed examples involve receiving, by the control system, $1^{st}$ through $N^{th}$ audio data of $1^{st}$ through $N^{th}$ input audio data types including $1^{st}$ through $N^{th}$ audio signals and associated $1^{st}$ through $N^{th}$ spatial data, where N is an integer greater than 2.

The adjectives "first," "second" and "$N^{th}$," in the context of the audio data types, the one or more audio signals and the associated spatial data, are merely used to distinguish one audio data type, etc., from another and do not necessarily indicate a temporal sequence. In other words, the audio data of the first audio data type is not necessarily received prior to a time at which the audio data of the second audio data type or the audio data of the $N^{th}$ audio data type is received.

The Dolby 5.1 audio format represented in FIG. 3A is an example of the "first audio data type" (or the second audio data type or the $N^{th}$ audio data type) described above. If the first audio data type is the Dolby 5.1 audio format, the "first spatial data" may be the intended perceived spatial positions (the loudspeaker positions) that are shown in representation 303A of FIG. 3A, a corresponding angular representation, or any other suitable representation. Likewise, if the second audio data type is the Dolby 7.1 audio format, the "second spatial data" may be the loudspeaker positions that are shown in representation 303B of FIG. 3A, the corresponding angular representation shown in FIG. 3B, or any other suitable representation.

Some disclosed examples may involve determining, by the control system, at least a first feature type from the input audio data. In some examples, the control system may be configured to determine two or more feature types from the input audio data. The feature type(s) may be, or may include, for example, one or more types of frequency domain representations of audio samples, such as a representation of the energy or power in each of a plurality of frequency bands. As noted elsewhere herein, spatial data may, in some examples, be considered a type of feature.

Some disclosed examples involve applying, by the control system, a positional encoding process to audio data, to produce encoded audio data. The encoded audio data may, in some examples, including representations of at least the first spatial data and the first feature type(s) in first embedding vectors of an embedding dimension. Some examples are shown in FIGS. 3A and 3B. In the example of FIG. 3A, the positional encoding process involves applying a positional encoding process to audio data in the Dolby 5.1 audio format, to produce the multi-channel format region 302A of the positional encoding matrix 301. According to the example of FIG. 3A, the positional encoding process involves applying a positional encoding process to audio data in the Dolby 7.1 audio format, to produce the multi-channel format region 302B of the positional encoding matrix 301. The "real world" loudspeaker positions of audio data in the Dolby 5.1 and 7.1 audio formats may be initially represented as shown in representations 303A and 303B of FIG. 3A (for example, represented via (x,y) coordinates), represented via angular coordinates as shown in FIG. 3B, or represented in any other convenient manner.

FIG. 4 shows representations of a positional encoding matrix and a positional encoding vector according to another example. According to this example, the elements of FIG. 4 are as follows:

- 401: Another example of a three-dimensional representation of a four-dimensional positional encoding matrix. In this example, the positional encoding matrix 301 is expressed as PE(T,C,B,D), where T represents a time frame, which is not shown in the three-dimensional representation of FIG. 4, C represents an audio content channel, B represents a discrete Fourier bin, and D represents an encoding dimension;

402: An example of a positional encoding vector in the encoding dimension D of the positional encoding matrix 401;

402A: A portion of the vector 402 showing an example of transformed input features, which in this instance are transformed via a function f,

402B: A portion of the vector 402 showing an example of transformed spatial data, which in this instance are transformed via a function g;

404: An example of a positional encoding matrix transform function f with respect to index i (through N) and coordinates in dimension B; and

405: An example of a positional encoding matrix transform function g with respect to index j (through M) and coordinates in dimension C.

In the examples shown in FIG. 4, each vector in the encoding dimension D is a concatenation of contributions from each of the input feature dimensions, in this case channel C and bin B. The portion of each vector in dimension D to which each dimension contributes (in this example, the portions 404 and 405) may or may not be equal. In other words, N and M are not necessarily equal, and in many instances would not be equal. The sizes of N and M may change depending on how many samples each feature dimension contains, and how much resolution is required across the feature dimension coordinates.

The actual number of bins (B) may not be N or (i+N). N could be less than, the same as, or greater than, the number of bins B. Making N less than the number of bins could reduce computational complexity. However, making N greater than the number of bins B for a particular data set could be helpful if there are other data sets that have a larger number of bins. For example, there may be input audio data for which there are known coordinates corresponding to bins and other input audio data for which the coordinates corresponding to bins are different. For example, in one case there may be 512 bins between zero and 24 kilohertz, whereas in another case there may be 256 bins between zero and 22.5 kilohertz. Making N greater than the number of bins B for either data set allows input data having different numbers of bins to be mapped to appropriate locations in the encoding dimension D.

Likewise, for dimension C, M may not correspond with the actual number of channels in the data set that is being transformed. Normally, M would be larger than C. Making M greater than the number of channels C for a particular data set could be helpful (or necessary) if there are other data formats having a larger number of channels. In the example shown in FIG. 3B, M corresponds with the granularity on the unit circle mapping after transformation to the encoding dimension D. Therefore, it can be advantageous to use large values of M, as compared with the actual number of channels in a given audio format, to ensure that the trained neural network will be able to create new content corresponding to any channel, even a channel that is not represented in any input data set used during the training process.

When parameters for the positional encoding matrix are created, it can be beneficial to ensure that there is an unique distance metric that results when the functions used to determine the vector portions of the encoding dimension D are applied, such that bins which were close to each other before transformation to the embedding dimension are still close to each other after transformation, and bins that were further away before transformation to the embedding dimension are still further away after transformation. The choice of N relative to B may be dependent on whether, for example, there are vectors which have quite similar but slightly different bin spacing. It is desirable to choose a function which can transform B into the encoding dimension D and ensure that there is a unique solution for, e.g., a 48 kilohertz sample rate example in which there may be a bin at one kilohertz and another sample rate example (such as a 44.1 kilohertz sample rate example) in which there may not be a bin at one kilohertz.

An effective positional encoding matrix can map discrete points of the input coordinates to a vector in the embedding dimension that can represent a set of discrete coordinates that may be important during a training process. An example of an effective positional encoding matrix is one that causes audio data corresponding to different audio content classes to be transformed to distinguishably different regions of an embedding space, such as what is shown in graph 110 of FIG. 1.

In some examples, disclosed positional encoding matrices accommodate the discrete co-ordinates that underly the content data 102 of FIG. 1. As per Equations 1, 2, and 3 below, there are multiple examples of reasons for improving upon previously-disclosed coordinate-free encoding matrices. Primarily, in the case of a control system which is prepared for a range of spatial audio channel formats, the modification, and addition of coordinates to, previously disclosed positional encoding formulations serves two purposes. Firstly, to provide a means to assign physical positional meaning to an audio channel, and secondly to allow a degree of freedom in the ordering and intended physical presentation position (spatial format) of the channels in the input data 103. This is to best encourage the control system in training to converge the latent space in such a way that the presentation of a set of content with different spatial formats, or, arbitrary spatial position and channel count as in Atmos, does not disrupt the latent space. In equation 3, it can be seen below that the spatial format position, θ, of the audio channel c is accommodated in the formulation of the positional encoding. A continuous function which transforms the spatial format channels position into an encoding which can be compared over a continuous range of positions may be desirable in some cases. In others, selecting a discrete set of arbitrary encoding vectors which prove maximal distance measurement over a discrete set of spatial format positions may be used instead. Importantly, the formulation of the disclosed encoding may be implemented in a variety of ways, as long as the encoding accommodates the spatial coordinate and, in distance measurements, provides a tractable and uniform result in encoding distance comparisons.

The secondary reason for the disclosed positional encoding methods may be seen in Equations 1 and 2, in which the time t is normalized by maximal time T, and frequency bin b, normalized by maximum frequency bin B used in the formulation of positional encoding. In applications there is potential for a plurality of discrete Fourier transform formulations such that the update rate in t and frequency spacing in b may change. This may be due to implementation restrictions, where a pre-trained control system may be subject to these conditions and still expected to be robust, but also, the accommodation of coordinates in these dimensions could provide a unique variance in the sampling of data during the training such that the final solution which the network converges to is better able to generalize, and find a more representative latent space.

The present disclosure includes other examples of applying a positional encoding process to audio data, to produce encoded audio data including representations of spatial data and one or more other feature types in embedding vectors of an embedding dimension. In the following example, there are three input feature types, each of which corresponds to a feature dimension. In these examples, ⅓ of the encoding dimension D is dedicated to each of the three input feature dimensions. In this example, Equations 1, 2 and 3, below, are each used to transform input feature types into a portion of an embedding dimension vector:

Equation 1

$$PE(c, b, t, d) = \begin{cases} \sin\left(\frac{t}{T} * w(d)\right), & \text{for all even } d \\ \cos\left(\frac{t}{T} * w(d)\right), & \text{for all odd } d \end{cases} \text{ while } d < \frac{D}{3}$$

Equation 2

$$PE(c, b, t, d) = \begin{cases} \sin\left(\frac{b}{B} * w(d)\right), & \text{for all even } d \\ \cos\left(\frac{b}{B} * w(d)\right), & \text{for all odd } d \end{cases} \text{ while } \frac{D}{3} < d < \frac{2}{3}D$$

Equation 3

$$PE(c, b, t, d) = \begin{cases} \sin(\theta(c) + c * w(d)), & \text{for all even } d \\ \cos(\theta(c) + c * w(d)), & \text{for all odd } d \end{cases} \text{ while } \frac{2}{3}D < d < D$$

In Equations 1, 2 and 3, w(d) may be expressed as follows:

$$w(d) = e^{-\frac{d}{D} \cdot log(f)}$$

In the foregoing equation, w (omega) represents the contribution to the alternating sin and cos encoding equations relative to the hidden dimension D. It is constructed to give unique values for each d and scaled by f to allow for numerically significant differences (closer to 1.0 rather than to 0 or to +/− infinity) in the final value throughout dimension d of the positional encoding matrix PE. An important underlying goal is to make a distinction that is indicative of physical distance, for example to ensure that PE(t=1,c=1, b=1,1<d<D) is close to PE(t=2,c=1,b=1,1<d<D) in Euclidian terms but far from PE(t=T,c=1,b=1,1<d<D) within the features in any of dimensions c, b and t, over their respective d encoding dimension. In the foregoing equation, f represents an arbitrary hyperparameter which is chosen so that the range of any of the PE matrix equations are numerically useful, for a computer, to avoid encoding dimension D degenerating below the precision that is measurable. A large range of numbers may be suitable values for f.

In these examples, as before, the positional encoding matrix PE may be expressed as a function of T,C,B and D, where T represents a time frame, C represents an audio content channel, B represents a discrete Fourier bin, and D represents an encoding dimension. In Equations 1-3, t represents a time instance or index of the time frame T, c represents an audio content channel index, b represents a discrete frequency domain feature, for example Fourier bin or Mel band of the B frequency domain bins (an index corresponding to B), and d represents an index of the encoding dimension D. In some examples, f may be larger than D. According to some examples, f may be many times larger than D.

Equations 1 and 2 may, in some examples, be normalized, e.g., in order to maintain a similar property for discrete time sampling intervals prior to performing a discrete Fourier transform (DFT), and for DFT bin frequency. This may be advantageous if different data sets have different sample rates. In some instances, different features from those data sets may be used, potentially corresponding to different feature extraction processes. Being able to specify a sample rate in Equations 1 and 2 may be beneficial in such examples.

For example, Equation 1 specifies the sign of the t index divided by the total T. Capital T represents the number of time instances in the time dimension T. Suppose that in one example there are one hundred time instances t in the time dimension T. One may choose to use data that was sampled at double that sampling rate, and in such examples one would want to account for the fact that T is not an index, but rather it is an absolute time that one has decided to normalize to. If those 100 samples represent one second of data, for example, then it would be advantageous to have a one-second constant somewhere in Equation 1, so that Equation 1 is agnostic to the actual time sampling frequency of the input data.

Figure 5:
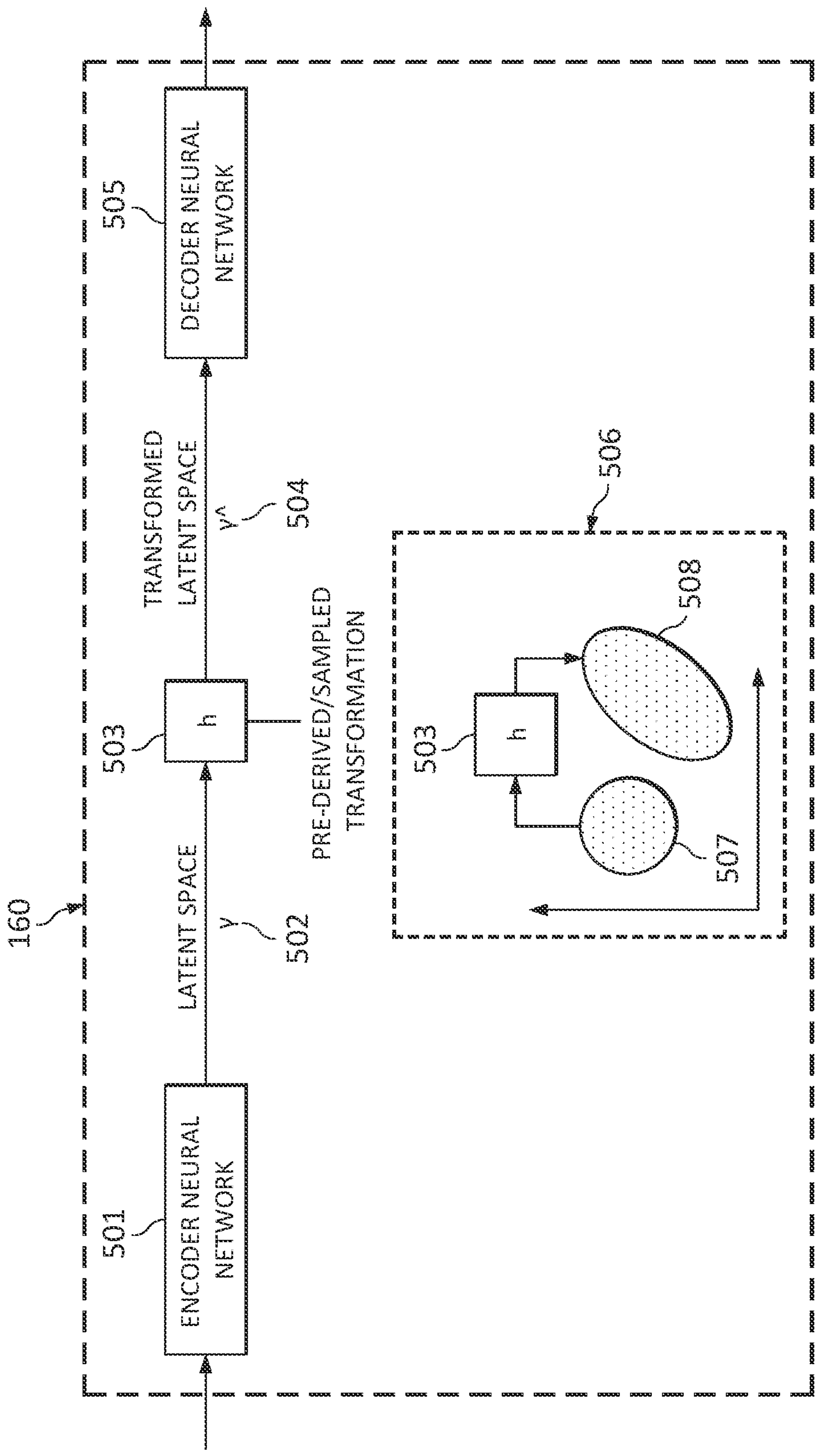
FIG. 5 shows blocks for generating new audio content according to one example.

FIG. 5 shows blocks for generating new audio content according to one example. According to this example, the blocks of FIG. 5 are implemented by an instance of the control system 160 of FIG. 2B. In this example, the control system 160 is configured to transform audio data from an input audio data type having an input spatial data type to audio data of a transformed audio data type having a transformed spatial data type. According to this example, the input spatial data type includes a lower number of channels than the transformed spatial data type. In some examples, the input spatial data type may correspond to a Dolby 5.1 audio format and the transformed spatial data type may correspond to a Dolby 6.1 audio format, a Dolby 7.1 audio format, a Dolby 9.1 audio format, a Dolby Atmos™ format, etc. In this example, the elements of FIG. 5 are as follows:

- 501: An encoder neural network configured to transform input audio data from a feature space into a lower-dimension ("bottlenecked") latent space;
- 502: A latent space vector, also shown as "y" in FIG. 5, which represents a point inside area 507;
- 503: A previously-derived (for example, by training a neural network as disclosed herein) transform h for generating a desired type of new audio content, which may be referred to as a transformed spatial data type. In this example, h is configured to transform latent space vectors corresponding to audio data of the input spatial data type to latent space vectors corresponding to audio data of the transformed spatial data type;
- 504: A transformed latent space vector, also shown as "y^" in FIG. 5, which represents a point inside area 508;
- 505: A decoder neural network, which is configured to transform vectors in the latent space to the feature space;
- 506: A two-dimensional representation of the latent space, which would generally have more than two dimensions;
- 507: A sampling of latent space vectors corresponding to audio data of the input spatial data type; and
- 508: A sampling of latent space vectors corresponding to audio data of the transformed spatial data type, which in this example includes more channels than audio data of the input spatial data type.

Aspects of an underlying model developed by training a neural network, which describes in general the difference between a lower and higher channel count content, can be appreciated when the model is implemented to transform latent space vectors. For example, if a network is trained with multiple examples of the same type of audio content (such as podcasts, music, television show dialogue, movie dialogue, etc.), having different spatial data types (such as lower- and higher-channel count versions) the neural network can derive one or more models, in the latent space, of what it means for a particular type of audio content to exist in one spatial data type or another.

By sampling the latent vectors for each spatial data type of the content, the neural network can derive a linear or non-linear mapping from one spatial data type of the audio content to another in a multidimensional latent vector space. For a database of similar audio content (for example, movie sound tracks) having different spatial data types, a neural network can be trained to derive a general mapping h (503), which can subsequently be used to transform the latent space vectors for audio data having one spatial data type (an input spatial data type) to audio data having another spatial data type having a higher channel count format (a transformed spatial data type) by generating new samples of content in the higher channel count format. In some instances, the audio data of the transformed spatial data type may not previously have existed in that particular spatial data type. For example, the audio data may have previously existed only in a lower-channel count version of the input audio data type, such as a Dolby 5.1 format, but may not have previously exited in a Dolby 7.1 format or any higher-channel format.

Figure 6:
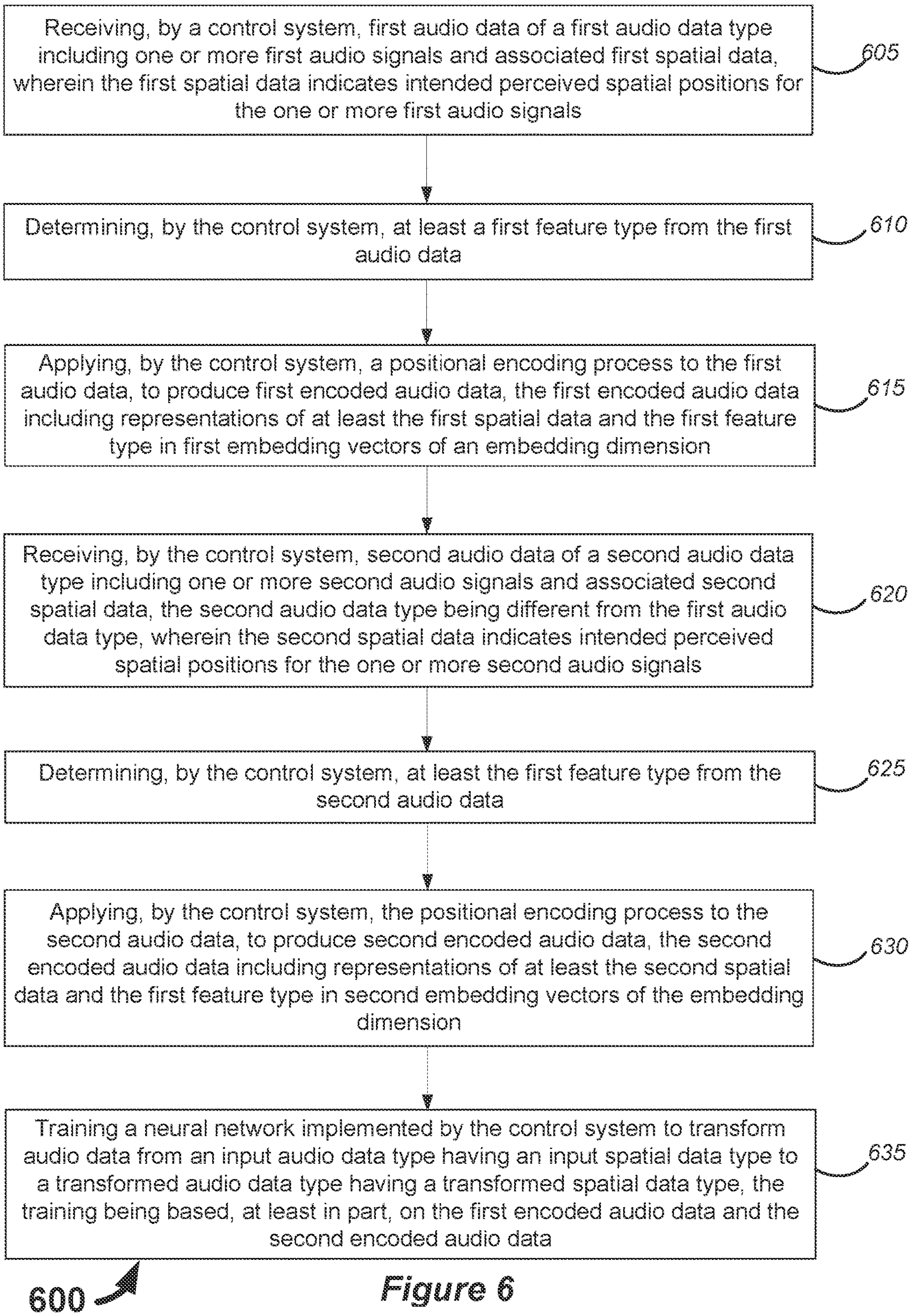
FIG. 6 is a flow diagram that outlines an example of a disclosed method.

FIG. 6 is a flow diagram that outlines an example of a disclosed method. The blocks of method 600, like other methods described herein, are not necessarily performed in the order indicated. Moreover, such methods may include more or fewer blocks than shown and/or described.

The method 600 may be performed by an apparatus or system, such as the apparatus 250 that is shown in FIG. 2B and described above, one or more components thereof, etc. In some such examples, an apparatus 250 configured to perform the method 600 may include at least the control system 160 shown in FIGS. 1 and 2, and described above.

In this example, block 605 involves receiving, by a control system, first audio data of a first audio data type including one or more first audio signals and associated first spatial data. Here, the first spatial data indicates intended perceived spatial positions for the one or more first audio signals. According to some examples, the intended perceived spatial position may correspond to a channel of a channel-based audio format, whereas in other examples the intended perceived spatial position may correspond to, and/or be indicated by, positional metadata of an audio object-based audio format such as Dolby Atmos™. In some examples, the first audio data type may correspond to an audio format, such as a Dolby 5.1 audio format, a Dolby 6.1 audio format, a Dolby 7.1 audio format, a Dolby 9.1 audio format, a Dolby Atmos™ audio format, etc. The first spatial data may be, or may include, information corresponding to loudspeaker locations corresponding to the audio format of the first audio data type. Some relevant examples of spatial data are disclosed herein, such as in the discussions of FIGS. 3A and 3B.

According to this example, block 610 involves determining, by the control system, at least a first feature type from the first audio data. The feature type(s) may be, or may include, for example, one or more frequency domain representations of audio samples, such as a representation of the energy or power in each of a plurality of frequency bands.

In this example, block 615 involves applying, by the control system, a positional encoding process to the first audio data, to produce first encoded audio data. According to this example, the first encoded audio data includes representations of at least the first spatial data and the first feature type in first embedding vectors of an embedding dimension. Some relevant examples of applying a positional encoding process are disclosed herein, including the discussions of FIGS. 3A, 3B and 4 and the discussions of Equations 1, 2 and 3.

According to this example, block 620 involves receiving, by the control system, second audio data of a second audio data type including one or more second audio signals and associated second spatial data. In this example, the second audio data type is different from the first audio data type. For example, if the first audio data type corresponds to a Dolby 5.1 audio format, the second audio data type may correspond to another audio format, such as a Dolby 6.1 audio format, a Dolby 7.1 audio format, a Dolby 9.1 audio format, a Dolby Atmos™ audio format, etc. Here, the second spatial data indicates intended perceived spatial positions for the one or more second audio signals. In this example, block 625 involves determining, by the control system, at least the first feature type from the second audio data.

In this example, block 630 involves applying, by the control system, the positional encoding process to the second audio data, to produce second encoded audio data. In this instance, the second encoded audio data includes representations of at least the second spatial data and the first feature type in second embedding vectors of the embedding dimension.

According to this example, block 635 involves training a neural network implemented by the control system to transform audio data from an input audio data type having an input spatial data type to a transformed audio data type having a transformed spatial data type. In some examples, the input spatial data type may correspond to a first audio data format and the transformed audio data type corresponds to a second (and different) audio data format. For example, the input spatial data type may correspond to a first number of channels and the transformed audio data type may correspond to a second number of channels. In this example, the training is based, at least in part, on the first encoded audio data and the second encoded audio data. Various examples of appropriate neural network training are disclosed herein, such as the description of FIGS. 1 and 2A.

In some examples, training the neural network may involve training the neural network to transform the first audio data to a first region of a latent space and to transform the second audio data to a second region of the latent space.

According to some examples, the second region may be at least partially separate from the first region, e.g., as shown in FIGS. 1 and 5. In some examples, the neural network may be, or may include, an attention-based neural network. According to some such examples, the neural network may include a multi-head attention module.

In some examples, method 600 may involve receiving, by the control system, $1^{st}$ through $N^{th}$ audio data of $1^{st}$ through $N^{th}$ input audio data types including $1^{st}$ through $N^{th}$ audio signals and associated $1^{st}$ a through $N^{th}$ spatial data, N being an integer greater than 2. In some such examples, method 600 may involve determining, by the control system, at least the first feature type from the $1^{st}$ through $N^{th}$ input audio data types. According to some such examples, method 600 may involve applying, by the control system, the positional encoding process to the $1^{st}$ through $N^{th}$ audio data, to produce $1^{st}$ through $N^{th}$ encoded audio data. In some such examples, method 600 may involve training the neural network based, at least in part, on the $1^{st}$ through $N^{th}$ encoded audio data.

According to some examples, method 600 may involve determining, by the control system, at least a second feature type from the first audio data and the second audio data. In some such examples, the positional encoding process may involve representing the second feature type in the embedding dimension.

In some examples, method 600 may involve receiving, by the control system, audio data of the input audio data type. In some such examples, method 600 may involve transforming, by the control system, the audio data of the input audio data type to audio data of the transformed audio data type.

Figure 7:
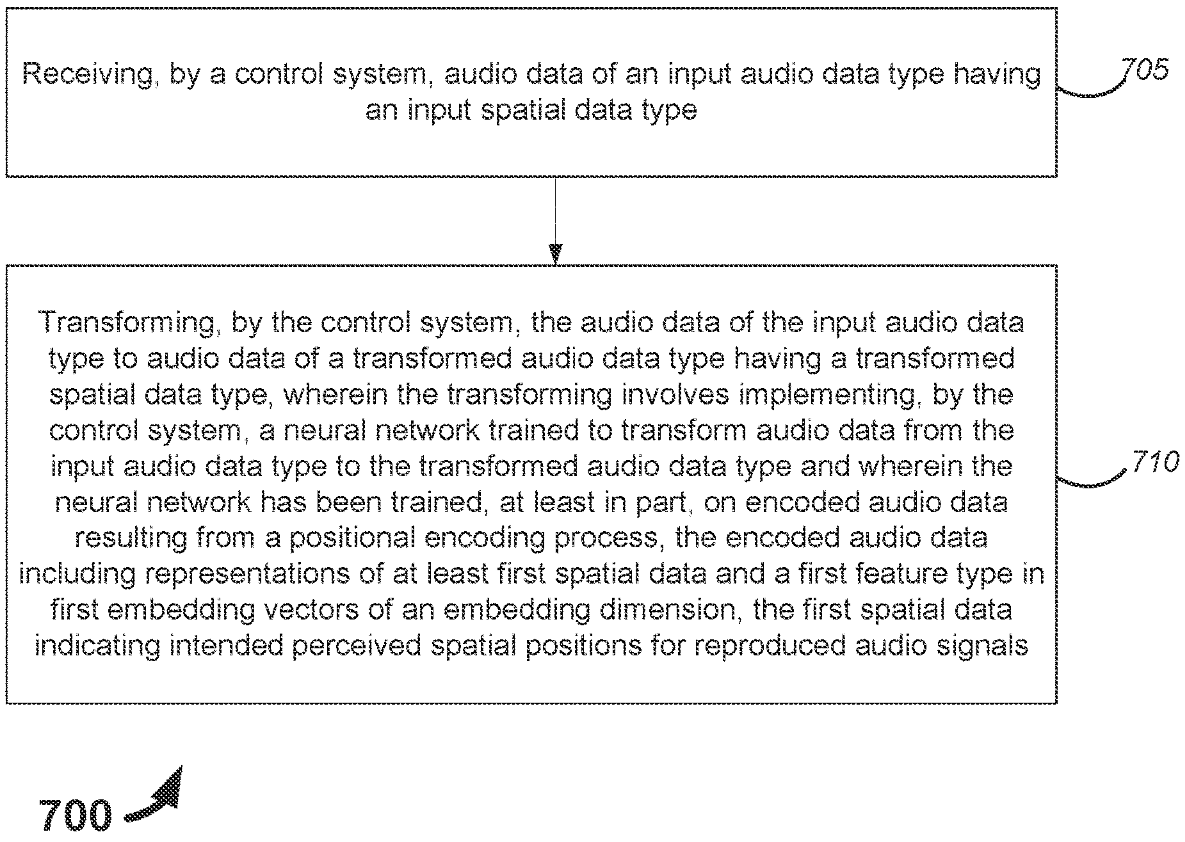
FIG. 7 is a flow diagram that outlines an example of another disclosed method.

FIG. 7 is a flow diagram that outlines an example of another disclosed method. The blocks of method 700, like other methods described herein, are not necessarily performed in the order indicated. Moreover, such methods may include more or fewer blocks than shown and/or described. The method 700 may be performed by an apparatus or system, such as the apparatus 250 that is shown in FIG. 2B and described above, one or more components thereof, etc. In some such examples, an apparatus 250 configured to perform the method 700 includes at least the control system 160 shown in FIG. 2B and described above.

According to this example, method 700 involves implementing a neural network that has been trained to transform audio data from an input audio data type to a transformed audio data type. In some examples, the neural network may have been trained as described herein, e.g., with reference to FIG. 1, FIG. 2A or FIG. 6.

In this example, block 705 involves receiving, by a control system, audio data of an input audio data type having an input spatial data type. The input spatial data type may, for example, correspond to an audio format, such as a Dolby 5.1 audio format, a Dolby 6.1 audio format, etc.

According to this example, block 710 involves transforming, by the control system, the audio data of the input audio data type to audio data of a transformed audio data type having a transformed spatial data type. In this example, the transforming involves implementing, by the control system, a neural network trained to transform audio data from the input audio data type to the transformed audio data type. According to this example, the neural network has been trained, at least in part, on encoded audio data resulting from a positional encoding process. Here, the encoded audio data included representations of at least first spatial data and a first feature type in first embedding vectors of an embedding dimension, the first spatial data indicating intended perceived spatial positions for reproduced audio signals.

In some examples, the input spatial data type may correspond to a first audio data format and the transformed audio data type may correspond to a second audio data format. For example, if the input spatial data type corresponds to a Dolby 5.1 audio format, the transformed audio data type may correspond to a Dolby 6.1 audio format, a Dolby 7.1 audio format, a Dolby 9.1 audio format, a Dolby Atmos format, etc.

In some examples, the neural network may have been trained to determine a transform h configured to transform latent space vectors corresponding to audio data of the input spatial data type to latent space vectors corresponding to audio data of the transformed spatial data type, e.g., as described with reference to FIG. 5.

Figure 8:
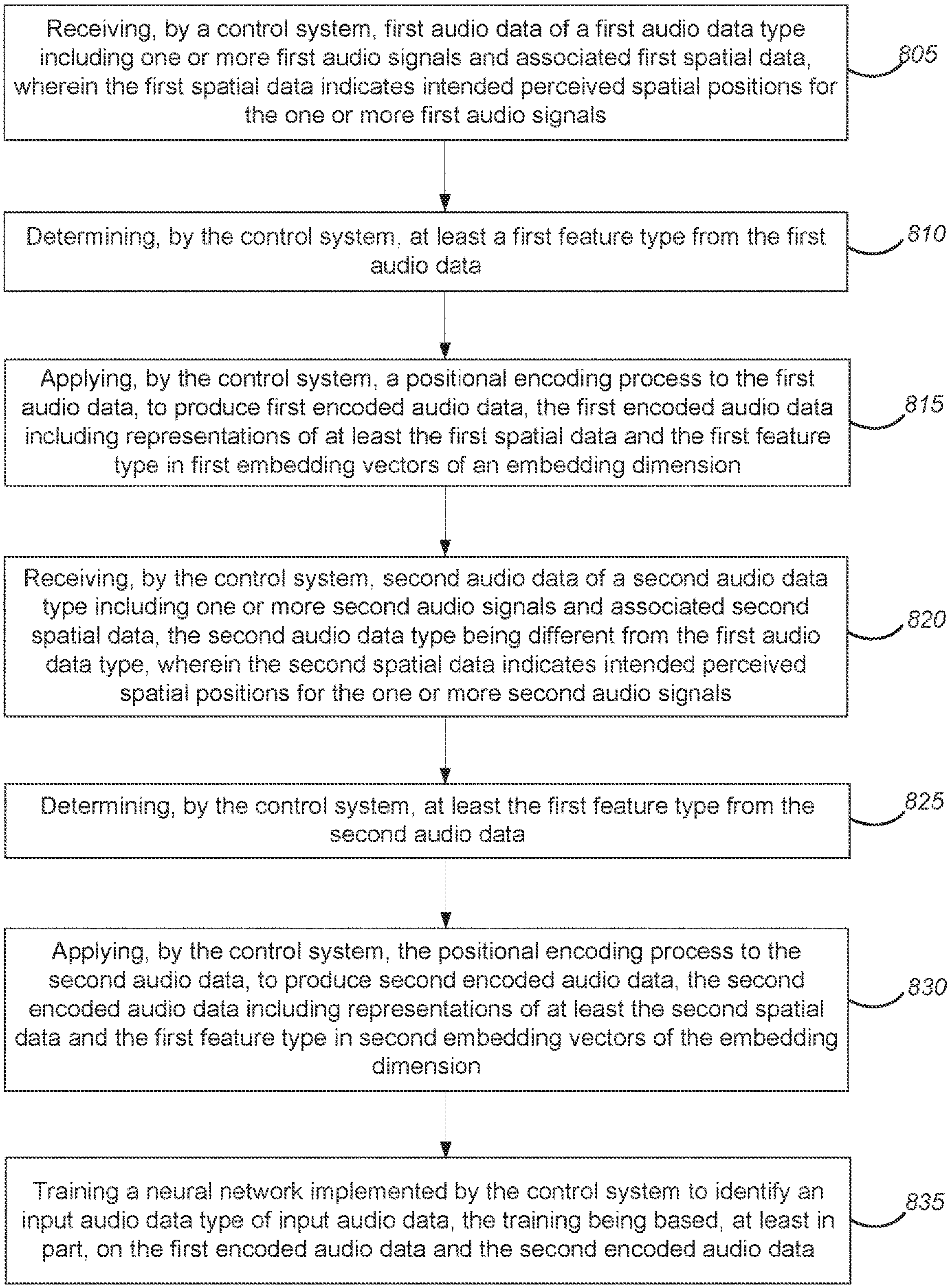
FIG. 8 is a flow diagram that outlines an example of an additional disclosed method.

FIG. 8 is a flow diagram that outlines an example of an additional disclosed method. The blocks of method 800, like other methods described herein, are not necessarily performed in the order indicated. Moreover, such methods may include more or fewer blocks than shown and/or described.

The method 800 may be performed by an apparatus or system, such as the apparatus 250 that is shown in FIG. 2B and described above, one or more components thereof, etc. In some such examples, an apparatus 250 configured to perform the method 800 includes at least the control system 160 shown in FIG. 2B and described above.

In this example, blocks 805-830 parallel blocks 605-630, which have been described in detail with reference to FIG. 6. As such, the descriptions of blocks 805-830 will not be re-stated here.

However, according to this example, block 835 involves training a neural network implemented by the control system to identify an input audio data type of input audio data. In this example, the training is based, at least in part, on the first encoded audio data and the second encoded audio data. Various examples of appropriate neural network training are disclosed herein, such as the description of FIGS. 1 and 2A.

In some examples, identifying the input audio data type may involve identifying a content type of the input audio data. According to some such examples, identifying the content type may involve determining whether the input audio data corresponds to a podcast, movie or television program dialogue, or music. In some such examples, identifying the content type may involve determining a region of a multidimensional latent space that corresponds with a particular content type, e.g., as shown in FIG. 1.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

What is claimed is:

1. A method, comprising:

receiving, by a control system, first audio data of a first audio data format including one or more first audio signals and associated first spatial data, wherein the first spatial data indicates intended perceived spatial positions for the one or more first audio signals;

determining, by the control system, at least a first feature type from the first audio data, wherein the first feature type corresponds to a frequency domain representation of the audio data;

applying, by the control system, a positional encoding process to the first audio data, to produce first encoded audio data, the first encoded audio data including representations of at least the first spatial data and the first feature type in first embedding vectors of an embedding dimension;

receiving, by the control system, second audio data of a second audio data format including one or more second audio signals and associated second spatial data, the second audio data format being different from the first audio data format, wherein the second spatial data indicates intended perceived spatial positions for the one or more second audio signals;

determining, by the control system, at least the first feature type from the second audio data;

applying, by the control system, the positional encoding process to the second audio data, to produce second encoded audio data, the second encoded audio data including representations of at least the second spatial data and the first feature type in second embedding vectors of the embedding dimension; and training a neural network implemented by the control system to transform input audio data from one audio data format to a different audio data format, the training being based, at least in part, on the first encoded audio data and the second encoded audio data.

2. The method of claim 1, wherein the method comprises:

receiving $1^{st}$ through $N^{th}$ audio data of $1^{st}$ through $N^{th}$ input audio data formats including $1^{st}$ through $N^{th}$ audio signals and associated $1^{st}$ through $N^{th}$ spatial data, N being an integer greater than 2;

determining, by the control system, at least the first feature type from the $1^{st}$ through $N^{th}$ input audio data formats;

applying, by the control system, the positional encoding process to the $1^{st}$ through $N^{th}$ audio data, to produce $1^{st}$ through $N^{th}$ encoded audio data; and training the neural network based, at least in part, on the $1^{st}$ through $N^{th}$ encoded audio data.

3. The method of claim 1, wherein the neural network is, or includes, an attention-based neural network.

4. The method of claim 1, wherein the neural network includes a multi-head attention module.

5. The method of claim 1, wherein training the neural network involves training the neural network to transform the first audio data to a first region of a latent space and to transform the second audio data to a second region of the latent space, the second region being at least partially separate from the first region.

6. The method of claim 1, wherein the intended perceived spatial position corresponds to at least one of a channel of a channel-based audio format or positional metadata.

7. The method of claim 1, further comprising determining, by the control system, at least a second feature type from the first audio data and the second audio data, wherein the positional encoding process involves representing the second feature type in the embedding dimension.

8. A neural network trained according to the method of claim 1.

9. One or more non-transitory media having software stored thereon, the software including instructions for implementing the neural network of claim 8.

10. An audio processing method, comprising:

receiving, by a control system, input audio data having a first audio data format; and transforming, by the control system, the input audio data to a second audio data format, wherein the transforming involves implementing, by the control system, a neural network trained to transform audio data from one audio data format to a different audio data format and wherein the neural network has been trained, at least in part, on encoded audio data resulting from a positional encoding process, the encoded audio data including representations of at least first spatial data and a first feature type in first embedding vectors of an embedding dimension, wherein the first feature type corresponds to a frequency domain representation of the audio data, the first spatial data indicating intended perceived spatial positions for reproduced audio signals.

11. A method, comprising:

receiving, by a control system, first audio data of a first audio data format including one or more first audio signals and associated first spatial data, wherein the first spatial data indicates intended perceived spatial positions for the one or more first audio signals;

determining, by the control system, at least a first feature type from the first audio data, wherein the first feature type corresponds to a frequency domain representation of the audio data;

applying, by the control system, a positional encoding process to the first audio data, to produce first encoded audio data, the first encoded audio data including representations of at least the first spatial data and the first feature type in first embedding vectors of an embedding dimension;

receiving, by the control system, second audio data of a second audio data format including one or more second audio signals and associated second spatial data, the second audio data format being different from the first audio data type, wherein the second spatial data indicates intended perceived spatial positions for the one or more second audio signals;

determining, by the control system, at least the first feature type from the second audio data;

applying, by the control system, the positional encoding process to the second audio data, to produce second encoded audio data, the second encoded audio data including representations of at least the second spatial data and the first feature type in second embedding vectors of the embedding dimension; and training a neural network implemented by the control system to identify an input audio data type of input audio data, wherein identifying the input audio data type involves identifying a content type of the input audio data, the training being based, at least in part, on the first encoded audio data and the second encoded audio data.

12. The method of claim 11, wherein identifying the input audio data type involves determining whether the input audio data corresponds to a podcast, movie or television program dialogue, or music.

13. The method of claim 11, further comprising training the neural network to generate new content of a selected content type.

14. An apparatus configured to perform the method of claim 1.

15. One or more non-transitory media having software stored thereon, the software including instructions for controlling one or more devices to perform the method of claim 1.

* * * * *